Patented Oct. 1, 1935

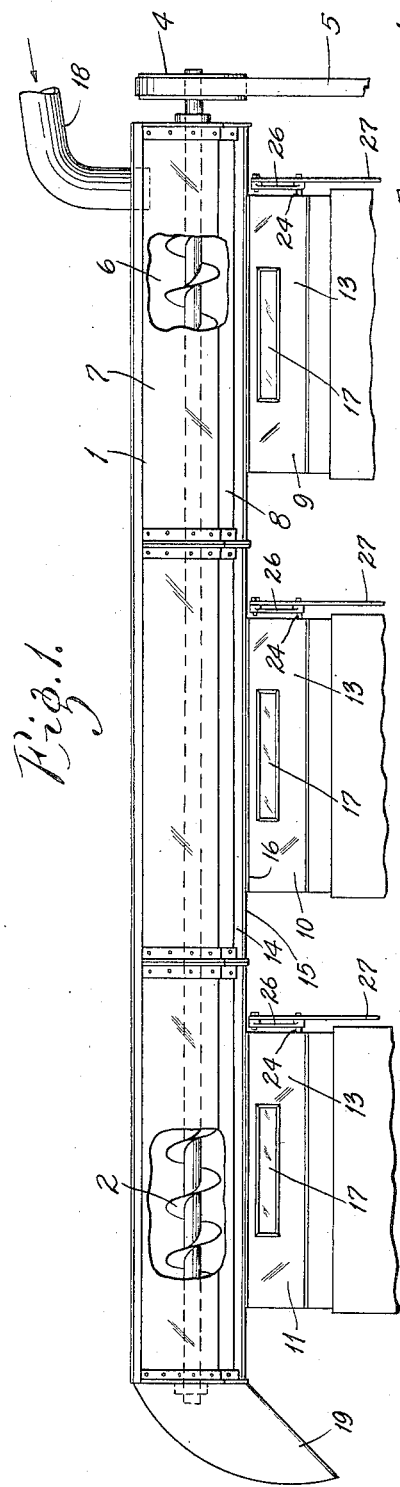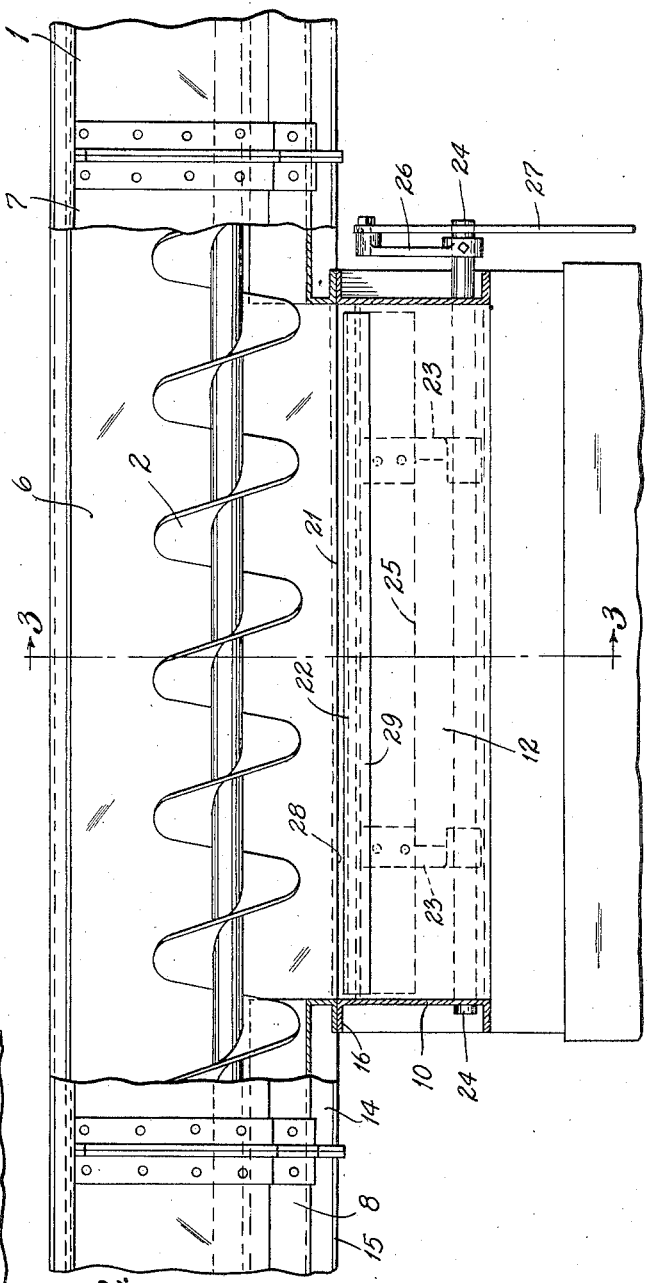

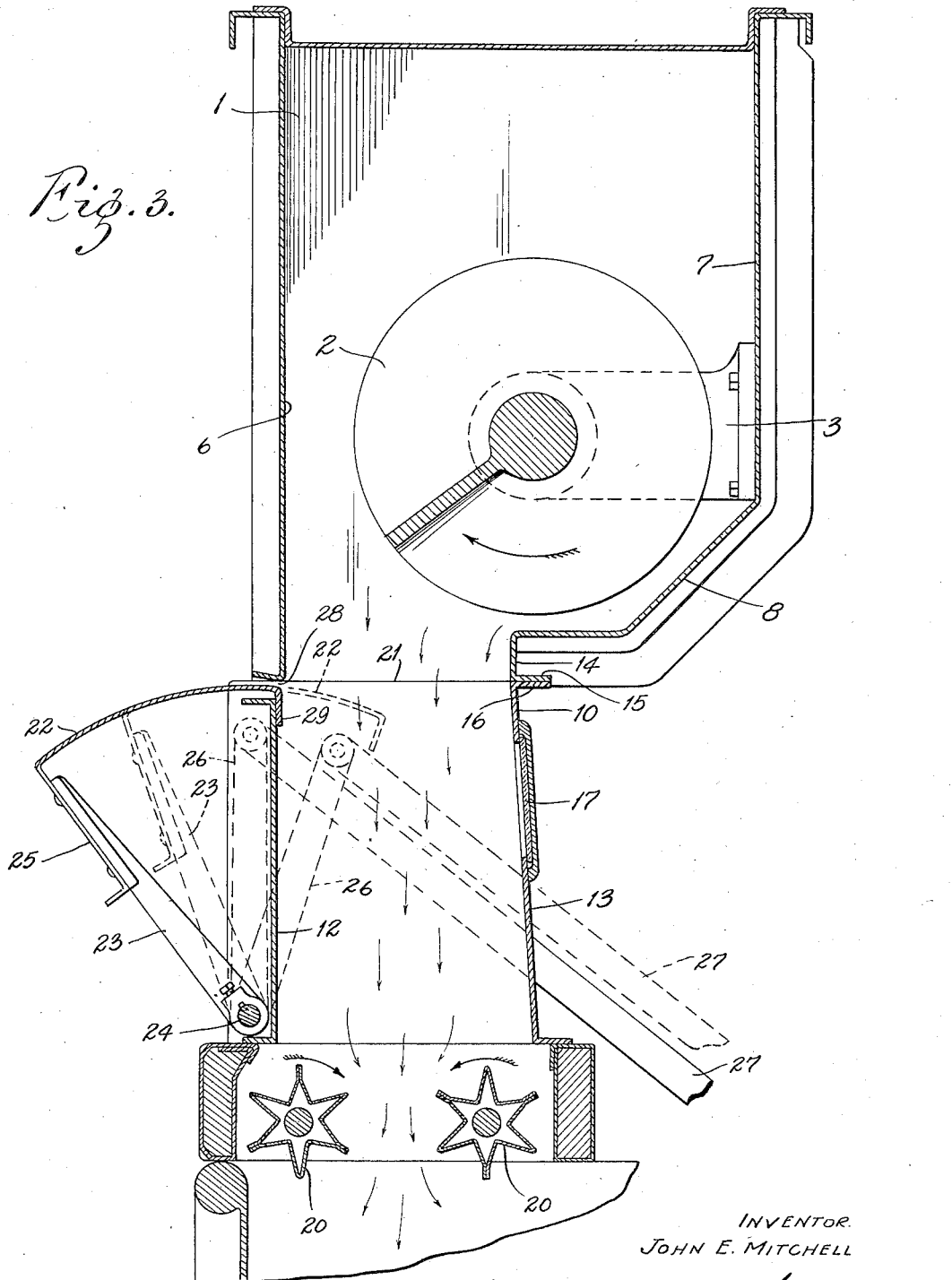

2,015,954

UNITED STATES PATENT OFFICE 2,015,954

COTTON DISTRIBUTING AND RECEIVING SYSTEM

John E. Mitchell, Dallas, Tex.

Application February 5, 1934, Serial No. 709,771

2 Claims. (Cl. 19—74)

My invention relates to an improved cotton distributing and receiving system employing a single-screw conveyor distributor for the cotton, and has for one of its broad objects to provide a single screw conveyor disposed within an elongated housing provided at intervals along its bottom with openings through which cotton passes to the hoppers below, and to dispose said openings and hoppers beneath the carrying side of the conveyor only.

Another object of the invention consists in providing a single-screw conveyor distributor disposed within an elongated casing, and to provide a series of receiving hoppers spaced apart along the bottom of the casing but offset to one side, whereby the walls on one side of the hoppers are substantially in line with the casing wall on the carrying side of the conveyor, the other walls of the hoppers extend approximately beneath the axis of the conveyor, and the non-carrying side of the conveyor is surrounded by the other wall of the casing to a point substantially beneath the longitudinal center of said conveyor.

Another object of the invention consists in providing novel cut-off valves in the receiving hoppers and novel means for operating the same.

In all single-screw conveyor distributors heretofore used of which I am aware, the receiving hoppers are disposed substantially directly beneath the central portion of the conveyor. Experience has shown that in such an arrangement the cotton is packed unevenly in the hoppers, by reason of the fact that the load of cotton handled by the conveyor is often too heavy or bulky to float along the carrying side thereof. As a result, bodies of cotton are continually thrown over to the down, or non-carrying side, of the conveyor, and if the hoppers happen to be full at the point where the throw-over occurs, the downward thrust of the screw will pack the body of cotton at different points in the hoppers, causing the hoppers to contain varying quantities of cotton, or the body of cotton contained in any one hopper to vary in density from one end to the other thereof, so that in withdrawing the cotton from the hoppers by the usual feed rollers, it is impossible to obtain a uniform feed of the cotton to the ginning, cleaning, or other machinery below the hoppers.

This particular objection, incident to the use of single-screw conveyor distributors, is obviated by the use of double-screw conveyor distributors; and in such devices the hoppers are located underneath the carrying side of both of the conveyors, the non-carrying sides of the conveyors being housed around beneath to a point extending in a line substantially beneath the axis of each conveyor, so that any cotton carried around by either of the screw conveyors is thrust downward against the housings and not into the hoppers.

Thus, by the time the cotton reaches the hoppers from the non-carrying side of either conveyor, if the hoppers are full, the cotton is again lifted by the carrying side of the conveyor. This arrangement, therefore, overcomes the objection to packing cotton in the hoppers incident to the use of the single-screw conveyor distributor, in which the hoppers are located directly beneath the conveyor.

There are, however, serious objections to the use of double-screw conveyor distributors. In the first place, both conveyors must necessarily be comparatively small in diameter, which results in large quantities of cotton being carried over and around one screw or the other, and this tends to rope, or machine, the cotton, especially the staple varieties, when containing excess moisture.

Another objection to the use of double-screw conveyor distributors is that there is insufficient clearance between the casing and the hangers, or bearing-supports, of the small-diameter conveyors for the quantity of cotton carried around, which often results in choking, and in sometimes breaking a hanger, or damaging the spiral flights of the conveyors.

A still further objection to the use of the double-screw type of distributor is the fact that a relatively large number of supports and bearings is required, in addition to the means for gearing the two screws together, and for this and other reasons, this type of distributor is more expensive to manufacture than the single-screw type.

According to my invention, I combine the advantages of both the single and double-screw types of conveyor distributors without the disadvantages or difficulties of either type.

The preferred construction by means of which the purposes of my invention are attained is illustrated in the accompanying drawings, in which:

Figure 1 is a view in side elevation partly in section of a distributing and receiving system constructed and arranged according to my invention;

Figure 2 is a similar view of a portion of said system on an enlarged scale; and Figure 3 is a cross sectional view on an enlarged scale taken on the line 3—3 of Figure 2.

Referring now to the drawings, the numeral 1 indicates the distributor casing which, as shown in Figure 3, is substantially rectangular in cross section, except as to one side as hereinafter described. Mounted in the casing and extending from end to end thereof is a single-screw conveyor, 2, the opposite ends of the shaft of which are mounted in bearings, 3. One end of this shaft is provided with a pulley, 4, by means of which the conveyor may be driven by a belt, 5, from any suitable source of power. The casing 1, is provided with parallel side walls, 6, 7, and according to my invention the wall 7, on the non-carrying side of the conveyor is continued beneath the conveyor to a point extending beneath the axis or longitudinal center of the conveyor, as indicated at 8. Thus the non-carrying side of the conveyor is substantially housed in by this under-extension of the side wall 7 of the casing.

The numerals 9, 10, and 11 indicate, respectively, a number of receiving hoppers, any number of said hoppers being provided according to the number of machines, such as gins, cleaning machines, or the like, provided in the battery of machines to be supplied with cotton by the distributor. As shown by Figure 3, one wall, 12, of each hopper extends downwardly in substantial continuation of the rear wall 6 of the casing. The other, or front wall, 13, of the hopper extends downwardly on a slight incline from the point of termination of the under-extending portion 8 of the front wall 7 of the casing. As shown, the portion 8, of the casing wall is bent downwardly as indicated at 14, and then outwardly as indicated at 15, to provide a flange, which rests on a similar flange, 16, provided at the upper end of the wall 13 of the hopper. Each hopper is preferably provided in the wall 13 with a glass window, 17, so that the level of the cotton may be readily observed. The conveyor 2 rotating in the direction shown by the arrow in Figure 3, it will be seen that the hoppers 9, 10 and 11 are off-set to one side of the distributor casing and are located under the carrying side of the conveyor only. Thus, in operation, it will be clear to those skilled in the art that with the receiving hoppers off-set as described, the cotton not only falls freely into the hoppers between the conveyor flights on the carrying side of the conveyor, but that any bodies of cotton thrown over to the non-carrying side will be rolled gently into the hopper if there should be room in the hopper to receive them; or, if the hopper should be full at that point, the cotton thrown over will be again lifted to the carrying side of the conveyor without any downward thrust or packing action against the cotton already in the hopper.

The distributor casing is supplied with cotton at one end by any conventional means, as indicated at 18, and is provided with a spout 19 for over-flow cotton at its other end. The hoppers are filled one at a time, and all of the hoppers filled before any cotton is delivered to the overflow. Furthermore, the bodies of cotton in the hoppers will be of uniform density throughout the length of each hopper, which insures having the regulated stream withdrawn from the bottom of each hopper by the feeder rolls, 20, uniform in quantity from one end of the hopper to the other.

The cotton is supplied to the hoppers through elongated openings, 21, provided at intervals throughout the length of the bottom of the casing 1, one side of said openings being formed by the side wall 6 of the casing on the carrying side of the conveyor, which is extended below the conveyor for that purpose, and the other side of each opening being preferably formed by the flanged portion 14 of the under-extending portion 8 of the side wall 7 of the casing. It is one of the advantages of my invention that, by avoiding packing of the cotton in the hoppers, and consequently keeping the cotton uniformly loose, narrow hoppers can be used, so that only a comparatively small quantity of cotton is required to fill each hopper. Furthermore, the comparatively thin, loose bodies of cotton confined in the hoppers permits of rotating the feeder rolls 20 at a higher speed; and the faster the feeder rolls turn in withdrawing a given quantity within a given time, the more uniformly the locks of cotton will be spread or fed to the machinery below the hoppers.

It is not essential to my invention to have the sides 13 of the hoppers exactly on the vertical line through the axis of the conveyor. It is essential, however, that the conveyor should be housed around beneath the non-carrying side to a point approaching near enough to the longitudinal center of the conveyor to prevent bodies of cotton carried over by the conveyor being thrust downward into a hopper which, as explained above, would result in packing, if the hopper happened to be full at the point where the throw-over and consequent downward thrust of the cotton occurred. This, of course, involves also the necessity of the receiving hoppers being off-set as described.

The conveyor 2 is of a diameter to occupy substantially the entire working space between the front wall 7 and rear wall 6 of the casing, and it necessarily follows from the above description of the construction that the elongated openings 21 provided in the bottom of the casing are considerably less in width than the diameter of the conveyor.

In order to cut off the supply of cotton to any one of the hoppers when desired, each of said hoppers is provided with a cut off valve with a curved valve member, 22, extending substantially throughout the length of the hopper and mounted by means of arms, 23, on a shaft, 24, the shaft and arms being located on the outside of the hopper, as shown by Figure 3, and the arms 23 being secured to a radial flange, 25, formed at one side of the valve member 22. Mounted on one end of the shaft 24, is a crank, 26, to the outer end of which is pivotally secured a pull-rod, 27, which extends downward within the reach of the operator. The valve member 22 works through an opening 28 between the lower end of the side wall 6 of the casing and the upper end of the side wall 12 of the hopper, and when the rod 27 is pulled, will be moved in an arcuate path from the outside into and across the hopper, the circular path followed in its movement having substantially the same radius as the curve of the valve member. On its inner end the valve member 22 is turned downwardly to provide a flanged stop, 29 which is adapted to engage the inner side of wall 12 of the hopper at the top, and thus limit the outward movement of said valve member.

I claim:

1. A cotton distributing and receiving system comprising, in combination, an elongated casing, means for moving cotton therethrough consisting of a single screw conveyor mounted in said casing, and of a diameter to occupy substantially the entire working space between the walls of the casing, the latter being provided with spaced elongated openings in its bottom, less in width than the diameter of said conveyor and located to one side of the median line of the casing to cause them to be removed from the zone of action of the non-carrying side thereof, and receiving hoppers communicating with the casing through said openings, whereby the cotton being distributed by the conveyor is permitted to fall freely into the hoppers and fill the same uniformly without being packed by the downward thrust of the non-carrying side of the conveyor.

2. A cotton distributing and receiving system comprising, in combination, an elongated casing, a single screw conveyor mounted in said casing and of a diameter to occupy substantially the entire working space between the walls of the casing, said casing being provided in its bottom with spaced, elongated openings located beneath the carrying side of the conveyor and less in width than the diameter of said conveyor, said casing having a straight, vertical side wall in conveying relation to the carrying side of the conveyor and extending past and below the conveyor to form one side of said openings, and receiving hoppers communicating with the openings, one of the side walls of each hopper being substantially in line with the extended side wall of the casing, while the other wall of each hopper lies substantially in a vertical line extending through the axis of the conveyor, the opposite wall of the casing from that named having at its lower end an inwardly-directed portion extending beneath the non-carrying side of the conveyor and terminating in the plane of said other walls of the hoppers.

JOHN E. MITCHELL.